(12) United States Patent
Hatano et al.

(10) Patent No.: US 9,289,964 B2
(45) Date of Patent: Mar. 22, 2016

(54) HIGH PURITY FERRITIC STAINLESS STEEL SHEET EXCELLENT IN CORROSION RESISTANCE AND ANTI-GLARE PROPERTY

(75) Inventors: Masaharu Hatano, Tokyo (JP); Hiroyuki Matsuyama, Tokyo (JP); Akihito Yamagishi, Tokyo (JP); Naoto Hansaki, Tokyo (JP); Eiichiro Ishimaru, Tokyo (JP)

(73) Assignee: NIPPON STEEL & SUMIKIN STAINLESS STEEL CORPORATION, Tokyo (JP)

(*) Notice: Subject to any disclaimer, the term of this patent is extended or adjusted under 35 U.S.C. 154(b) by 294 days.

(21) Appl. No.: 14/001,920

(22) PCT Filed: Mar. 5, 2012

(86) PCT No.: PCT/JP2012/055583
§ 371 (c)(1),
(2), (4) Date: Aug. 28, 2013

(87) PCT Pub. No.: WO2012/124528
PCT Pub. Date: Sep. 20, 2012

(65) Prior Publication Data
US 2013/0337289 A1  Dec. 19, 2013

(30) Foreign Application Priority Data
Mar. 14, 2011 (JP) .................. 2011-055947

(51) Int. Cl.
| | |
|---|---|
| C22C 38/18 | (2006.01) |
| C22C 38/02 | (2006.01) |
| C22C 38/04 | (2006.01) |
| C22C 38/06 | (2006.01) |
| C22C 38/08 | (2006.01) |
| B32B 15/01 | (2006.01) |
| C22C 38/00 | (2006.01) |
| C21D 8/02 | (2006.01) |
| C22C 38/26 | (2006.01) |
| C22C 38/28 | (2006.01) |
| C22C 38/32 | (2006.01) |
| C21D 6/00 | (2006.01) |

(52) U.S. Cl.
CPC .............. *B32B 15/01* (2013.01); *C21D 8/0226* (2013.01); *C21D 8/0236* (2013.01); *C21D 8/0263* (2013.01); *C21D 8/0268* (2013.01); *C21D 8/0273* (2013.01); *C22C 38/001* (2013.01); *C22C 38/005* (2013.01); *C22C 38/008* (2013.01); *C22C 38/02* (2013.01); *C22C 38/04* (2013.01); *C22C 38/06* (2013.01); *C22C 38/18* (2013.01); *C22C 38/26* (2013.01); *C22C 38/28* (2013.01); *C22C 38/32* (2013.01); *C21D 6/002* (2013.01); *Y10T 428/12979* (2015.01)

(58) Field of Classification Search
None
See application file for complete search history.

(56) References Cited

U.S. PATENT DOCUMENTS

2011/0265920 A1  11/2011  Hatano et al.

FOREIGN PATENT DOCUMENTS

| | | |
|---|---|---|
| JP | 5-163557 A | 6/1993 |
| JP | 6-182401 A | 7/1994 |
| JP | 8-109443 A | 4/1996 |
| JP | 8-239733 A | 9/1996 |
| JP | 9-87868 A | 3/1997 |
| JP | 9-291382 A | 11/1997 |
| JP | 11-12704 A | 1/1999 |
| JP | 11-61350 A | 3/1999 |
| JP | 2000-233205 A | 8/2000 |
| JP | 2001-355048 A | 12/2001 |
| JP | 2009-174036 A | 8/2009 |
| JP | 2010-159487 A | 8/2009 |
| JP | 2010-116619 A | 5/2010 |
| JP | 2010-159487 A | 7/2010 |

OTHER PUBLICATIONS

Extended European Search Report dated Sep. 15, 2014, issued in corresponding European Patent Application No. 12756952.3.
International Search Report, mailed May 22, 2012, issued in PCT/JP2012/055583.

*Primary Examiner* — Deborah Yee
(74) *Attorney, Agent, or Firm* — Birch, Stewart, Kolasch & Birch, LLP

(57) ABSTRACT

An alloy-saving type high purity ferritic stainless steel sheet, comprising a steel sheet which contains, by mass %, C: 0.001 to 0.03%, Si: 0.01 to 1%, Mn: 0.01 to 1.5%, P: 0.005 to 0.05%, S: 0.0001 to 0.01%, Cr: 13 to 30%, N: 0.001 to 0.03%, Al: 0.005 to 1%, and Sn: 0.01 to 1% and has a balance of Fe and unavoidable impurities and which has a surface film, the surface film containing one or both of Al and Si in a total of 5 to 50 at % and Sn, an average concentration of Cr in the surface film being 1.1 to 3 times the concentration of Cr inside the steel sheet, and the surface film having a surface roughness of an arithmetic average roughness Ra of 0.1 to 1.5 μm.

4 Claims, No Drawings

HIGH PURITY FERRITIC STAINLESS STEEL SHEET EXCELLENT IN CORROSION RESISTANCE AND ANTI-GLARE PROPERTY

TECHNICAL FIELD

The present invention relates to an alloy-saving type dull finish high purity ferritic stainless steel sheet excellent in corrosion resistance and anti-glare property which is suitable for use for household electrical appliances or kitchen appliances and interior or external siding in building materials. Note that "dull finish", "dull finish rolling", dull rolls, dull roll rolling, etc. shall mean deluster finish, deluster finish rolling, deluster rolls, deluster rolling, etc.

BACKGROUND ART

Ferritic stainless steel sheet is being used in a wide range of fields such as household electrical appliances or kitchen appliances and interior or external siding in building materials. In recent years, improvements in the art of refining have made much lower carbon and nitrogen contents and reduction of P, S, and other impurity elements possible. Ferritic stainless steel sheet which has been raised in corrosion resistance and workability by adding Nb, Ti, and other stabilizing elements (below, "high purity ferritic stainless steel sheet") is being applied to a broad range of applications. This is because high purity ferritic stainless steel sheet is superior in terms of economy compared with austenitic stainless steel sheet which contains a large amount of Ni—an element whose price has remarkably soared in recent years.

In recent years, in high purity ferritic stainless steel sheet excellent in corrosion resistance, demand has been rising for an anti-glare property as one facet of the surface quality of steel sheet not only in interior and exterior siding in building materials, but also in household electrical appliances and kitchen appliances. In general, ferritic stainless steel sheet is inferior compared to austenitic stainless steel sheet in anti-glare property. Austenitic stainless steel sheet relatively easily forms intergranular corrosion grooves by nitric hydrofluoric acid pickling. Due to the random reflection of light by the microrelief shapes, it is easy to obtain surface properties excellent in milky white color and low luster anti-glare property. As opposed to this, high purity ferritic stainless steel sheet contains large amounts of at least one of Cr and No so is high in alloying degree and has Nb, Ti, etc. added as stabilizing elements. Therefore, high purity ferritic stainless steel sheet is high in intergranular corrosion resistance and is not formed with intergranular corrosion grooves in annealing and pickling. This is disadvantageous for securing an anti-glare property.

Due to the above-mentioned problems in the anti-glare property, various methods of production have been studied in recent years. For example, PLT 1 discloses a method of production of dull finish stainless steel sheet excellent in anti-glare property, color tone uniformity, and corrosion resistance comprising annealing and pickling stainless cold rolled steel sheet in the atmosphere, then lightly rolling it by dull rolls and further annealing or bright annealing, then pickling it in the atmosphere.

PLT 2 discloses a method of production of dull finish stainless steel sheet comprising, during the pickling performed before and after dull finish rolling of the sheet, prescribing in detail the conditions of electrolytic pickling by a sulfuric acid aqueous solution and nitric acid aqueous solution and conditions of dipping in a nitric hydrofluoric acid aqueous solution.

However, PLT 1 and PLT 2 disclose examples of SUS304 and SUS444 of the Japan Industrial Standard (JIS standard), but do not disclose details of the chemical composition of the steel.

As high purity ferritic stainless steel sheet, for example, PLT 3 discloses ferritic stainless steel sheet which contains Cr: 16 to 35% and Mo: less than 6% and further contains one or more of Nb: 0.01 to 1%, Ti: 0.01 to 0.5%, V: 0.01 to 0.3%, Cu: 0.5% or less, and Al: 0.005 to 0.3%, in which ferritic stainless steel sheet, the conditions of electrolytic pickling in the nitric acid aqueous solution are defined and the color tone stability anti-glare property and corrosion resistance are improved, and a method of production of the same.

PLT 4 discloses ferritic stainless steel sheet which contains $C \leq 0.02\%$, $N \leq 0.02\%$, Cr: 21.5 to 31%, Mo: 0.3 to 4%, Ti: 0.1 to 0.3%, and Nb: 0.15 to 0.5% and satisfies $Cr+1.7Mo \geq 24\%$, in which ferritic stainless steel sheet, annealing is performed in an oxidizing atmosphere, the conditions of nitric hydrofluoric acid pickling after that are defined, and the corrosion resistance is improved, and a method of production of the same.

Further, PLT 5 discloses high Cr-content bright annealed stainless steel sheet which has a chemical composition of which satisfies $C \leq 0.02\%$, $Si \leq 1\%$, $Mn \leq 1\%$, $P \leq 0.04\%$, $Ni \leq 0.6\%$, Cr: 16 to 35%, Ti: 0.05 to (0.5-10×N), Al: 0.005 to 0.3%, $Mo \leq 0.6\%$, $Nb \leq 1\%$, $Cu \leq 0.5\%$, and $N \leq 0.02\%$, in which ferritic stainless steel sheet, details of the bright annealing conditions are defined and the surface of the steel sheet is formed with relief shapes with a 10-point average roughness Rz of 1 to 50 µm, whereby an anti-glare property is imparted and the surface quality of the steel sheet is improved, and a method of production of the same.

PLTs 3 to 5 disclose examples of ferritic stainless steel sheet which contain Cr: 22% or more and Mo. Therefore, the stainless steel sheets which are disclosed in PLTs 3 to 5 relate to high purity ferritic stainless steel sheet which contains large amounts of at least one of the above-mentioned Cr and Mo.

On the other hand, as high purity ferritic stainless steel not containing large amounts of at least one of Cr and Mo, for example, PLT 6 discloses ferritic stainless steel sheet which contains $C \leq 0.03\%$, $Si \leq 0.3\%$, $Mn \leq 1\%$, $P \leq 0.08\%$, $S \leq 0.02\%$, Cr: 10 to 35%, $N \leq 0.08\%$, Nb: 0.05 to 2%, Ti: 0.05 to 2%, and Al: 0.08 to 0.8%, in which ferritic stainless steel sheet, a surface film which is formed by bright annealing contains Al: 15 at % or more and Nb: 6 at % or more and further Ti, a surface roughness is made an average roughness Ra of 0.3 µm to 0.95 µm to impart an anti-glare property, and the corrosion resistance and workability are improved. The ferritic stainless steel sheet of PLT 6 defines the surface film which is formed by the bright annealing so as to improve the corrosion resistance without including large amounts of at least one of Cr and Mo.

Up until now, from the viewpoints of resource-saving and workability, the inventors have proposed high purity ferritic stainless steel improved in corrosion resistance and workability without high alloying by the inclusion of at least one of Cr and Mo but by addition of a fine amount of Sn. The high purity ferritic stainless steel sheets which are proposed in PLTs 7 and 8 are high purity ferritic stainless steels which contain Cr: 13 to 22% and Sn: 0.001 to 1%, which reduce the C, N, Si, Mn, and P, have Al in 0.005 to 0.05% in range, and, in accordance with need, have stabilizing elements of at least one of Ti and Nb added.

CITATIONS LIST

Patent Literature

PLT 1: Japanese Patent Publication No. 6-182401A
PLT 2: Japanese Patent Publication No. 9-87868A
PLT 3: Japanese Patent Publication No. 8-239733A
PLT 4: Japanese Patent Publication No. 9-291382A
PLT 5: Japanese Patent Publication No. 11-61350A
PLT 6: Japanese Patent Publication No. 8-109443A
PLT 7: Japanese Patent Publication No. 2009-174036A
PLT 8: Japanese Patent Publication No. 2010-159487A

SUMMARY OF INVENTION

Technical Problem

As explained above, up until now, various methods of production giving stainless steel sheet an anti-glare property have been studied. However, conventional stainless steel sheet has been high alloy type high purity ferritic stainless steel sheet which contains Cr in a content of 22% or more and No so as to doubly provide corrosion resistance.

Further, high purity ferritic stainless steel sheet which does not rely on addition giving a large amount of at least one Cr and Mo, which control the composition of the surface film, has also been disclosed, but it has been limited to the surface film which is formed by bright annealing. Further, high purity ferritic stainless steel to which a fine amount of Sn has been added from the viewpoint of resource-saving and economy has been disclosed, but the anti-glare property and corrosion resistance have not been studied.

In view of the above-mentioned actual situation, an object of the present invention is to provide an alloy-saving type high purity ferritic stainless steel sheet which does not rely on high alloying by addition giving a large content of at least one of Cr and Mo, which is further not limited to a surface film formed by bright annealing, and which makes use of addition of Sn to doubly provide an anti-glare property and corrosion resistance.

Solution to Problem

The inventors worked to solve the above-mentioned problem by engaging in in-depth research on the effects of addition of Sn on the relationship of surface properties giving an anti-glare property and corrosion resistance in high purity ferritic stainless steel while focusing on the action and effect of a surface film which improves the corrosion resistance. As a result, they obtained the new discovery explained next.

(a) Sn is an element which is effective for improving the corrosion resistance of high purity ferritic stainless steel. By adding Sn, it is possible to achieve alloy-saving without relying on addition of a large amount of one or more of Cr and Mo. The present invention discovered that at the surface of steel sheet which has a large surface roughness and has been dulled to give an anti-glare property, addition of Sn results in a remarkable improvement in the corrosion resistance. Such action of improvement of the corrosion resistance is still unclear in many points, but the mechanism of action is guessed based on the experimental facts explained below.

(b) 16% Cr steel to which Sn: 0.25% is added (below, Sn-added steel), SUS304 (18% Cr-8% Ni steel), and the 22% Cr-1% Mo steel and 17% Cr-0.2% Ti steel disclosed in PLTs 3 to 5 were subjected to combined cycle corrosion tests based on the Japan Automotive Standards Organization (JASO) standard M609-91. The corrosion cycle was made (i) spraying of 5% NaCl aqueous solution at 35° C. for 2 hours→(ii) drying at 60° C. for 4 hours→(iii) wetting at 50° C. for 2 hours. The outer appearance was evaluated after 15 cycles. The shape of the test piece was made 70 mm×150 mm, while the surface state was made one finished by pickling after normal cold rolling (below, referred to as the "2B state") and, further, annealed and finished by pickling after dull finish rolling (below, referred to as the "DF state") and finished by bright annealing (below, referred to as the "BAD state"). The degree of rust formation of 17% Cr-0.2% Ti steel goes not greatly differ in the 2B state, DF state, and BAD state. In each case, red rust and outflow rust formed. On the other hand, in Sn-added steel, while rust formation was observed in the 2B state, almost no rust formed in the DF state and BAD state. An external appearance equal to or better than the dull finish surface of SUS304 or 22% Cr-1% Mo steel was exhibited and an excellent corrosion resistance was manifested.

(c) From a detailed surface analysis of Sn-added steel, the new discovery was obtained that by changing the surface film from the above-mentioned 2B state to at least one of the DF state and BAD state, (i) the concentration of Cr in the surface film rises, (ii) the content of Sn in the oxide and metal state in the surface film rises, (iii) annealing and pickling or bright annealing causes concentration of one or both of Al and Si at the surface of the surface film to progress, and (iv) when Sn-added steel contains Nb and Ti, annealing and pickling or bright annealing causes concentration of one or more of Al, Si, Nb, and Ti at the surface film to progress. That is, by addition of a fine amount of Sn, the concentration of Cr and the content of Sn in the surface film which is formed when dull finish rolling steel sheet etc. to give surface properties including an anti-glare property, then annealing and pickling it or bright annealing it can be raised and the concentration of elements effective for improvement of the corrosion resistance such as Al, Si, Ti, and Nb is promoted. Due to the action and effect of such addition of Sn, the Si-added steel can achieve a corrosion resistance comparable to the above-mentioned SUS304 or 22% Cr-1% Mo steel by an alloy-saving Cr steel.

(d) The mechanism of action of the above-mentioned addition of Sn still has much unclear about it. PLT 8 clarifies the concentration of Cr and Sn into the passivation film by the addition of Sn and the accompanying effect of improvement of the corrosion resistance. The present invention discovers the new finding in surface properties with large surface roughness that these actions and effects become superimposed and promote the concentration of elements effective for improvement of the corrosion resistance such as Al, Si, Ti, and Nb in the surface film.

(e) To improve the above-mentioned effect of improvement of the corrosion resistance, reduction of C, N, P, and S is effective for achieving a higher purity of steel and raising the Al and Si contents. Further, adding a stabilizing element of at least one of Nb and Ti is effective.

(f) The method of production of high purity ferritic stainless steel sheet of the present invention is not particularly limited, but the action and effect of the above addition of Sn are manifested from a surface average roughness Ra of 0.1 μm or more. Therefore, the surface of the steel sheet has to be dull rolled so as to give an arithmetic average roughness Ra of 0.1 μm or more, then annealed and finished by pickling or finished by bright annealing.

The present invention was made based on the findings of the above (a) to (f) and has as its gist the following:

(1) High purity ferritic stainless steel sheet excellent in corrosion resistance and anti-glare property which comprises steel sheet which contains, by mass %, C: 0.001 to 0.03%,
Si: 0.01 to 1%,
Mn: 0.01 to 1.5%,
P: 0.005 to 0.05%,
S: 0.0001 to 0.01%,
Cr: 13 to 30%,
N: 0.001 to 0.03%,
Al: 0.005 to 1%, and
Sn: 0.01 to 1% and
has a balance of Fe and unavoidable impurities and which has a surface film, the surface film containing, by ratio of only cations which make up the surface film other than C, O, and N, one or both of Al and Si in a total of 5 to 50 at % and Sn and an average concentration of Cr in the surface film being, by ratio of only cations which make up the surface film other than C, O, and N, 1.1 to 3 times the concentration of Cr inside the steel sheet, and the surface film having a surface roughness of an arithmetic average roughness Ra of 0.1 to 1.5 µm.

(2) The high purity ferritic stainless steel sheet excellent in corrosion resistance and anti-glare property as set forth in the above (1) wherein the steel sheet further contains, by mass %, one or more of types of elements selected from
Nb: 0.03 to 0.5%,
Ti: 0.03 to 0.5%,
Ni: 0.1 to 0.5%,
Cu: 0.1 to 0.5%,
Mo: 0.1 to 0.5%,
V: 0.01 to 0.5%,
Zr: 0.01 to 0.5%,
Co: 0.01 to 0.5%,
Mg: 0.0001 to 0.005%,
B: 0.0003 to 0.005%, and
Ca: 0.005% or less, and
the surface film further contains, by ratio of only cations which make up the surface film other than C, O, and N, one or more types of Al, Si, Nb, and Ti in a total of 5 to 50 at % or more.

(3) The high purity ferritic stainless steel sheet excellent in corrosion resistance and anti-glare property as set forth in (1) or (2) wherein the steel sheet further contains, by mass %, one or more types of elements selected from:
La: 0.001 to 0.1%,
Y: 0.001 to 0.1%,
Hf: 0.001 to 0.1%, and
REM: 0.001 to 0.1%.

Advantageous Effects of Invention

According to the present invention, it is possible to obtain an alloy-saving type high purity ferritic stainless steel sheet not relying on high alloying by addition giving a large content of at least one of Cr and Mo and, further, not limited to a surface film which is formed by bright annealing and adding Sn to high purity ferritic stainless steel sheet to be able to doubly provide an anti-glare property and corrosion resistance.

DESCRIPTION OF EMBODIMENTS

Below, the present invention will be explained in detail. Note that the indications of "%" of the contents of the elements mean "mass %" unless otherwise indicated.

(A) The reasons for limitation of the chemical composition will be explained below: C causes the corrosion resistance to degrade, so the smaller the content, the better, therefore the upper limit is made 0.03%. However, excessive reduction leads to an increase in the refining costs, so the lower limit is made 0.001%. Preferably, considering the corrosion resistance and the manufacturing costs, the content is made 0.002 to 0.01%.

Si is an element which is effective as a deoxidizing element and also has the action of raising the corrosion resistance of the present invention. To improve the deoxidizing agent and the corrosion resistance of the present invention, the lower limit is made 0.01%. However, excessive addition invites a drop in the toughness and workability of the steel, so the upper limit is made 1%. Preferably, considering the advantageous effect and manufacturability, the content is made 0.1 to 0.6%. more preferably 0.15 to 0.5%.

Mn is an element which forms sulfides and interferes with the corrosion resistance, so the smaller the content, the better. To keep down the drop in the corrosion resistance, the upper limit is made 1.5%. However, excessive reduction leads to an increase in the refining costs, so the lower limit is made 0.01%. Preferably, considering the corrosion resistance and the manufacturing costs, the content is made 0.05 to 0.5%.

P is an element which interferes with the manufacturability and weldability, so the smaller the content the better. From the standpoint of suppression of the drop in the manufacturability and weldability, the upper limit is made 0.05%. However, excessive reduction leads to an increase in the refining costs, so the lower limit is made 0.005%. Preferably, considering the manufacturing costs, the content is made 0.01 to 0.04%.

S causes the corrosion resistance and the hot workability to degrade, so the smaller the content, the better. Therefore, the upper limit is made 0.01%. However, excessive reduction leads to an increase in the refining costs, so the lower limit is made 0.0001%. Preferably, considering the corrosion resistance and manufacturing costs, the content is made 0.0002 to 0.002%.

Cr is a major element in the high purity ferritic stainless steel of the present invention. It is an element which is essential for improving the corrosion resistance which is targeted by the present invention by addition of Sn. To obtain the effect of improvement of the corrosion resistance of the present invention, the lower limit is made 13%. The upper limit is made 30% from the viewpoint of the manufacturability. However, from the economy compared with SUS304 or 22% Cr-1% Mo steel, preferably the content is made 14 to 22%. Considering the performance and the alloy cost, the content is more preferably 16 to 18%.

N, in the same way as C, causes the corrosion resistance to degrade, so the smaller the content the better, therefore the upper limit is made 0.03%. However, excessive reduction leads to an increase in the refining costs, so the lower limit is made 0.001%. Preferably, considering the corrosion resistance and manufacturing cost, the content is made 0.005 to 0.015%.

Al is an element effective as a deoxidizing element and in addition is an element essential for improvement of the corrosion resistance which is targeted by the present invention. The lower limit is made 0.005% to obtain the effect of improvement of the corrosion resistance superposed with the addition of Sn. The upper limit is made 1% from the viewpoint of the manufacturability and the weldability and workability. However, from the performance and manufacturability compared with SUS304 and 22% Cr-1% Mo steel, the content is preferably 0.03 to 0.8%. More preferably, it is made 0.05 to 0.5%.

Sn is an element essential for securing the improvement in the corrosion resistance which is targeted by the present invention in surface properties giving an anti-glare property without relying on alloying by at least one of Cr and Mo or bright annealing for control of the surface film. To obtain the effect of improvement of the corrosion resistance which is targeted by the present invention, the lower limit is made 0.01%. The upper limit is made 1% from the viewpoint of the manufacturability. However, from the economy compared with SUS304 or 22Cr-1% Mo steel, the content is preferably 0.1 to 0.6%. Considering the performance and alloy cost, the content is more preferably 0.2 to 0.5%.

Nb and Ti are elements which improve the corrosion resistance by the action of stabilizing elements which fix the C and N and are added in accordance with need. In the case of addition, the contents are made 0.03% or more where the effects are manifested. However, excessive addition leads to a rise in the alloy cost and to a drop in the manufacturability accompanying the rise in the recrystallization temperature, so the upper limits are made 0.5%. Considering the advantageous effect and alloy cost and manufacturability, Nb and Ti are preferably made 0.05 to 0.5%. More preferably, the contents are made 0.1 to 0.3% in range.

Ni, Cu, Mo, V, Zr, and Co are elements which are effective for raising the corrosion resistance due to the synergistic effect with the Sn and are added in accordance with need. Ni, Cu, and Mo, when added, are respectively made 0.1% or more where their effects are manifested. V, Zr, and Co, when added, are made 0.01% or more where their advantageous effects are manifested. However, excessive addition leads to a rise in the alloy cost or a drop in the manufacturability, so the upper limit is made 0.5%.

Mg forms Mg oxides in the molten steel together with the Al to act as a deoxidizer and also acts as a nuclei for precipitation of TiN. TiN becomes the nuclei for solidification of the ferrite phase in the solidification process and promotes the precipitation of TiN so enables fine formation of a ferrite phase at the time of solidification. By making the solidified structure finer, it is possible to prevent ridging or roping or other surface defects of the product due to the coarse solidified structure. This is added in accordance with need so as to bring about an improvement in the workability. In the case of addition, the content is made 0.0001% where the effects are exhibited. However, if over 0.005%, the manufacturability deteriorates, so the upper limit is made 0.005%. Preferably, considering the manufacturability, the content is made 0.0003 to 0.002%.

B is an element which improves the hot workability and secondary workability. Addition to high purity ferritic stainless steel is effective. When added, the content is made 0.0003% or more for expressing these effects. However, excessive addition causes a drop in the elongation, so the upper limit is made 0.005%. Preferably, considering the material costs and workability, the content is made 0.0005 to 0.002%.

Ca is an element which improves the hot workability and the cleanliness of the steel and is added according to need. In the case of addition, the content is made 0.0003% or more where these effects are manifested. However, excessive addition leads to a drop in the manufacturability and a drop in the corrosion resistance due to CaS and other water-soluble inclusions, so the upper limit is made 0.005%. Preferably, considering the manufacturability and the corrosion resistance, the content is made 0.0003 to 0.0015%.

La, Y, Hf, and REM have the effects of improving the hot workability and the cleanliness of the steel and remarkably improving the corrosion resistance and the hot workability, so may be added in accordance with need. When added, the contents are respectively made 0.001% or more where these effects are manifested. However, excessive addition leads to a rise in the alloy cost and a drop in the manufacturability, so the upper limits are respectively made 0.1%. Preferably, considering the effects and the economy and manufacturability, the content for one or more types is made 0.001 to 0.05%.

(B) The reasons for limitation relating to the surface properties will be explained below. To satisfy a corrosion resistance equal to or better than SUS304 or 22% Cr-1% Mo steel by the chemical composition of the above (A) while obtaining an anti-glare property as well, the surface roughness of the steel sheet is made an arithmetic average roughness Ra of 0.1 µm or more.

Increasing the surface roughness, as explained above, has the action of promoting a rise in the concentration of Cr and the Sn content at the surface film and the concentration of Al, Si, Ti, and Nb at the surface film and improving the corrosion resistance. However, if excessively increasing the surface roughness, the anti-glare property rises, but due to the non-uniformity of the surface film in the annealing and pickling and the bright annealing and the deposits and contamination at the recessed parts etc., there is a risk of causing a drop in the corrosion resistance. Therefore, the upper limit of the arithmetic average roughness Ra is made 1.5 µm. If considering the advantageous effect and the manufacturability, the preferable arithmetic average roughness Ra is 0.2 to 1.0 µm. The more preferable Ra is 0.5 to 0.9 µm.

The method of production for obtaining the above surface properties is not particularly defined, but to realize the above effects on an industrial production scale, it is preferable to produce the steel sheet through the following such production process and various conditions.

The extraction temperature after the heating in hot rolling of a cast slab is preferably made 1100° C. or more where scale easily forms by the chemical composition of the high purity ferritic stainless steel sheet of the present invention. This is because to secure excellent surface properties, it is effective to remove inclusions at the cast slab surface, which would otherwise cause scabs, by the formation of scale. The target for the amount of formation of scale is a thickness of scale of 0.1 mm or more. On the other hand, if the extraction temperature after hot rolling is higher than 1200° C., MnS or CaS which form starting points for rusting are formed. Therefore, it is preferable to keep the hot rolling heating temperature to 1200° C. or less to stabilize the TiCS.

The coiling temperature after hot rolling is preferably made 700° C. or less enabling the steel toughness to be secured and enabling internal oxides and internal oxidation which would invite a drop in surface properties to be suppressed. This is because if over 700° C., the precipitates including Ti and P would easily precipitate and would be liable to lead to a drop in the corrosion resistance. On the other hand, if making the coiling temperature after hot rolling less than 400° C., poured water after hot rolling is liable to invite shape defects in the hot rolled steel strip and induce surface defects at the time of uncoiling or sheet running. Considering the chemical composition of the high purity ferritic stainless steel sheet of the present invention and the improvement of the corrosion resistance which is targeted by the present invention, it is more preferable that the coiling temperature after hot rolling be made 500 to 600° C.

It is also possible to hot roll the steel, then anneal the hot rolled sheet. The annealing temperature of the hot rolled sheet when annealing the hot rolled sheet is preferably 850 to 1050° C. if considering the drop in the surface properties and the pickling descalability. The annealing of the hot rolled sheet is more preferably performed at 900° C. or more when adding, in addition to Sn and Cr, Nb and Ti and other stabilizing elements.

When annealing the hot rolled sheet, after annealing the hot rolled sheet, or, when omitting the annealing of the hot rolled sheet, after the hot rolling, the sheet is cold rolled once or cold rolled two times or more with process annealing in between. The cold rolling is preferably made the following process in order to obtain the anti-glare property and corrosion resistance of the present invention without impairing the productivity.

At the final pass of the cold rolling process, dull rolls are used for dull finish rolling. For example, dull roll rolling is performed using dull rolls which were treated by electrodischarge to give roll surfaces with an arithmetic average roughness Ra of 1 to 10 μm.

In the above way, compared with the case of dull roll rolling, the productivity is inferior, but the dull finish may be given in the following way. That is, normal cold rolling is performed, then annealing and pickling or bright annealing is performed, then the softened steel sheet is rolled by dull roll rolling to give it a dull finish. This is so as to reduce the variation in color tone in the dull finish rolling and facilitate transfer of the dull pattern.

The dull finish cold rolled steel sheet is improved in the corrosion resistance which is targeted by the present invention by next annealing and pickling it in an oxidizing atmosphere or bright annealing it. The annealing temperature in the oxidizing atmosphere is preferably 1000° C. or less. This is so as to reduce the changes in the surface properties accompanying the formation of oxide scale. On the other hand, the lower limit of the annealing temperature in an oxidizing atmosphere is preferably made 800° C. This is so as to cause complete recrystallization by the chemical composition of the high purity ferritic stainless steel sheet of the present invention.

The pickling method is not particularly prescribed. It may be an ordinary method which is industrially used. For example, there is the method of dipping in an alkali salt bath, electrolytic pickling, then dipping in nitric hydrofluoric acid. The electrolytic pickling may be neutral salt electrolysis, nitric acid electrolysis, etc.

When making the finishing annealing bright annealing, the bright annealing temperature is made 800 to 1000° C. in range. To further improve the corrosion resistance, it is preferable to lower the dew point of the atmospheric gas and promote the selective oxidation of Al, Si, Nb, and Ti. In this case, for the atmospheric gas, hydrogen gas or a mixed gas of hydrogen and nitrogen is used. The dew point of the atmospheric gas is made −70 to −30° C. in range. More preferably, hydrogen gas is made 80% or more and the dew point of the atmospheric gas is made −50° C. or less. Bright annealed steel sheet may be treated by nitric acid electrolysis in accordance with need in order to raise the concentration of Cr in the surface film.

(C) The reasons for limitation relating to the chemical composition of the surface film will be explained below.

As explained up to here, the high purity ferritic stainless steel sheet of the present invention has a surface film. The average concentration of Cr in the surface film has to be 1.1 times or more the concentration of Cr inside the steel sheet. This is because if the average concentration of Cr in the surface film is less than 1.1 times the concentration of Cr inside of the steel sheet, it is not possible to secure an anti-glare property while obtaining the desired corrosion resistance. On the other hand, the higher the upper limit of the average concentration of Cr in the surface film the better, but as explained later, the surface film contains one or more of Al, Si, Nb, and Ti in a total of 5 to 50 at % and contains Sn in 1 to 10 at %, so the upper limit of the average concentration of Cr becomes 3 times that. Here, the concentration of Cr inside of the steel sheet means the amount of Cr which is contained in the steel sheet.

Further, the surface film has to contain, in addition to Sn, a total of one or both of Al and Si of 5 to 50 at %. This is because if not containing a total of one or both of Al and Si of 5 at % or more, concentration of Al and Si is not sufficient for securing the anti-glare property while obtaining the desired corrosion resistance. On the other hand, even if including one or both of Al and Si in a total of over 50 at %, the effect of improvement of the corrosion resistance becomes saturated. The content of Sn in the surface film is preferably made 1 to 10 at %. This is because if the surface film does not contain Sn, Al and Si cannot be concentrated in the surface film.

When the high purity ferritic stainless steel sheet of the present invention is made to include at least one of Nb and Ti, at least one of Nb and Ti is concentrated at the surface film and can raise the corrosion resistance in the same way as Al and Si. The effect is manifested when the total of the one or more of Ai, Si, Nb, and Ti is contained in the surface face 5 at % or more. On the other hand, even if exceeding 50 at %, the effect becomes saturated.

Note that, the average concentration of Cr in the surface film is expressed by the ratio of cations which form the surface film other than the C, O, and N. The contents of Al, Si, Nb, and Ti in the surface film are also expressed by the ratio of cations which form the surface film other than the C, O, and N. The methods of measurement of these will be explained in the following examples, so will be omitted here.

EXAMPLES

Below, examples of the present invention will be explained.

Each ferritic stainless steel having a chemical composition of Table 1 was smelted and was hot rolled at an extraction temperature of 1100 to 1200° C. to obtain a thickness 3.0 to 6.0 mm hot rolled steel sheet at a coiling temperature of 500 to 700° C. The hot rolled steel sheet was annealed and cold rolled once or twice with process annealing in between so as to produce 0.4 to 0.8 mm thick cold rolled steel sheet.

TABLE 1

| | (mass %) | | | | | | | | | | | |
|---|---|---|---|---|---|---|---|---|---|---|---|---|
| | C | Si | Mn | P | S | Cr | N | Al | Sn | Nb | Ti | Other elements | Remarks |
| A | 0.004 | 0.45 | 0.08 | 0.021 | 0.0005 | 16.6 | 0.010 | 0.45 | 0.23 | — | — | — | Inv. steel |
| B | 0.005 | 0.09 | 0.07 | 0.021 | 0.0006 | 16.7 | 0.011 | 0.035 | 0.29 | 0.12 | 0.08 | B: 5 ppm | Inv. steel |
| C | 0.004 | 0.25 | 0.08 | 0.022 | 0.0005 | 14.3 | 0.009 | 0.065 | 0.21 | 0.05 | 0.12 | — | Inv. steel |
| D | 0.004 | 0.22 | 0.08 | 0.022 | 0.0005 | 16.7 | 0.009 | 0.066 | 0.33 | 0.15 | 0.05 | Ni: 0.25 | Inv. steel |
| E | 0.003 | 0.18 | 0.08 | 0.022 | 0.0005 | 16.7 | 0.009 | 0.075 | 0.33 | 0.16 | 0.07 | Ni, Cu, Mo: 0.2 | Inv. steel |
| F | 0.027 | 0.65 | 0.08 | 0.021 | 0.0005 | 16.8 | 0.010 | 0.155 | 0.32 | 0.18 | 0.15 | Ni: 0.2, B: 5 ppm, Zr: 0.02 | Inv. steel |
| G | 0.003 | 0.12 | 1.20 | 0.021 | 0.0005 | 18.8 | 0.010 | 0.075 | 0.25 | — | — | La, Y: 0.1, REM: 0.05 | Inv. steel |

TABLE 1-continued (mass %)

| | C | Si | Mn | P | S | Cr | N | Al | Sn | Nb | Ti | Other elements | Remarks |
|---|---|---|---|---|---|---|---|---|---|---|---|---|---|
| H | 0.005 | 0.45 | 0.08 | 0.021 | 0.0005 | 23.5 | 0.010 | 0.025 | 0.20 | 0.25 | — | — | Inv. steel |
| I | 0.006 | 0.15 | 0.08 | 0.021 | 0.0005 | 16.4 | 0.026 | 0.035 | 0.32 | 0.17 | 0.18 | V: 0.2, La, Hf: 0.05 | Inv. steel |
| J | 0.003 | 0.16 | 0.08 | 0.021 | 0.0005 | 19.5 | 0.009 | 0.068 | 0.06 | 0.05 | 0.06 | B, Mg: 7 ppm | Inv. steel |
| K | 0.005 | 0.21 | 0.08 | 0.021 | 0.0005 | 16.2 | 0.010 | 0.065 | 0.48 | 0.07 | 0.06 | Zr, Co: 0.05, Ca: 7 ppm | Inv. steel |
| L | 0.035 | 0.09 | 0.08 | 0.022 | 0.0006 | 16.3 | 0.015 | 0.045 | 0.25 | 0.19 | 0.09 | — | Comp. steel |
| M | 0.003 | 0.13 | 1.70 | 0.023 | 0.0015 | 17.2 | 0.011 | 0.035 | 0.11 | 0.11 | 0.11 | — | Comp. steel |
| N | 0.005 | 0.08 | 0.09 | 0.022 | 0.0011 | 12.7 | 0.012 | 0.025 | 0.22 | — | 0.15 | — | Comp. steel |
| O | 0.003 | 0.18 | 0.11 | 0.023 | 0.0009 | 16.3 | 0.033 | 0.045 | 0.24 | — | 0.22 | — | Comp. steel |
| P | 0.005 | 0.11 | 0.11 | 0.021 | 0.0006 | 14.6 | 0.011 | 0.003 | 0.21 | — | 0.21 | — | Comp. steel |
| Q | 0.005 | 0.13 | 0.12 | 0.022 | 0.0011 | 14.3 | 0.013 | 0.045 | 0.008 | 0.15 | 0.05 | — | Comp. steel |
| AA | 0.037 | 0.12 | 0.11 | 0.025 | 0.0004 | 16.2 | 0.010 | 0.35 | 0.24 | — | — | — | Comp. steel |
| AB | 0.005 | 0.006 | 0.11 | 0.025 | 0.0004 | 16.4 | 0.009 | 0.25 | 0.25 | — | — | — | Comp. steel |
| AC | 0.005 | 0.08 | 1.57 | 0.025 | 0.0004 | 16.1 | 0.010 | 0.35 | 0.23 | — | — | — | Comp. steel |
| AD | 0.005 | 0.09 | 0.11 | 0.025 | 0.0115 | 16.2 | 0.010 | 0.35 | 0.24 | — | — | — | Comp. steel |
| AE | 0.005 | 0.15 | 0.11 | 0.025 | 0.0004 | 12.8 | 0.010 | 0.35 | 0.24 | — | — | — | Comp. steel |
| AF | 0.005 | 0.13 | 0.11 | 0.025 | 0.0004 | 16.2 | 0.035 | 0.35 | 0.24 | — | — | — | Comp. steel |
| AG | 0.005 | 0.07 | 0.11 | 0.025 | 0.0004 | 16.2 | 0.010 | 0.003 | 0.24 | — | — | — | Comp. steel |
| AH | 0.005 | 0.13 | 0.11 | 0.025 | 0.0004 | 16.2 | 0.010 | 0.35 | 0.007 | — | — | — | Comp. steel |
| SUS304 | 0.055 | 0.45 | 1.10 | 0.045 | 0.0035 | 18.2 | 0.035 | 0.003 | — | — | — | — | Conv. steel |
| SUS444 | 0.004 | 0.20 | 0.12 | 0.021 | 0.0009 | 22.5 | 0.015 | 0.060 | — | 0.35 | 0.20 | Mo: 1.1 | Conv. steel |

(Note)
Underlines indicate outside scope of present claims.
—: indicates not added.

The surface conditions were adjusted by dull roll rolling to surface roughnesses prescribed by the present invention and other roughnesses. The obtained cold rolled steel sheets were all annealed by final annealing at temperatures of 850 to 1000° C. where recrystallization ends. The final annealing is performed as annealing in an oxidizing atmosphere or bright annealing. The pickling after the annealing in an oxidizing atmosphere is performed by dipping in an alkali salt bath, neutral salt electrolysis, then dipping in nitric hydrofluoric acid. Steel sheets which were not treated by pickling after bright annealing and further were treated by nitric acid electrolysis were also produced.

Further, steel sheets which have surfaces finished by usual cold rolling rolls (based on JIS G4305: 2B, 2D) were also produced as comparative materials. Further, as conventional examples, dull finish steel sheets of SUS304 (18% Cr-8% Ni steel) and SUS444 (22% Cr-1% Mo steel) were prepared.

The surface roughness was found by measurement in the rolling direction and the vertical direction to rolling by a 2D roughness meter. The average value of the arithmetic average roughness Ra was given.

The surface film was analyzed by nondestructive analysis using X-ray photoelectron spectroscopy. The analysis area was in a range of a vertical 0.1 mm and horizontal 0.1 mm, while the analysis value was the average value of this area. The X-ray source used was AlKα rays (photoelectron energy generated: hv=1486 eV) and the takeout angle was made 90°. The detection depth was 5 nm or less. The results of analysis were given by the ratios of cations forming the surface film other than C, O, and N. The chemical composition of ingredients of the surface film was given in average values in the surface film.

The corrosion resistance was evaluated by the combined cyclic corrosion test based on JASO M609-91. The method of evaluation was made the same as described in the above (b). The degree of corrosion was evaluated based on the conventional examples of SUS304 and SUS444. That is, it was evaluated based on SUS304 where rust spots slightly formed over the entire test surface and SUS444 where almost no rust spots formed. Further, inferior to SUS304 was indicated as "C", equal to or better than SUS304 was evaluated as "B", and equal to SUS444 was evaluated as "A".

Table 2 shows together the production conditions and the results of evaluation of the different steel sheets.

TABLE 2

| | | Surface | | Surface film | | | | Final | | | | | |
|---|---|---|---|---|---|---|---|---|---|---|---|---|---|
| | | | | Contents of Sn, Al, Si, Nb, Ti | | | | Rust | annealing | AP | BA | | |
| No. | Steel | roughness Ra (μm) | Cr* | Sn (at %) | Elements other than Sn (at %) | | Total (at %) | resistance | temp. (° C.) | nitric acid % | H₂ (%) | DP (° C.) | Electrolysis | Remarks |
| 1 | A | 0.3 | 1.2 | 3 | Si + Al = 10 | | 13 | B | 880 | 8% | — | — | — | Inv. ex. |
| 2 | | 0.6 | 1.6 | 7 | Si + Al = 20 | | 27 | A | 900 | — | 85 | −50 | Yes | Inv. ex. |
| 3 | | 0.7 | 1.2 | 6 | Si + Al = 12 | | 18 | A | 870 | 9% | — | — | — | Inv. ex. |
| 4 | | 1.2 | 1.2 | 8 | Si + Al = 12 | | 20 | B | 880 | 8% | — | — | — | Inv. ex. |
| 5 | | 1.6* | 1.2 | 6 | Si + Al = 10 | | 16 | C | 870 | 7% | — | — | — | Comp. ex. |
| 6 | | 0.08* | 1.1 | 0.5 | Si + Al = 3 | | 3.5* | C | 880 | 8% | — | — | — | Comp. ex. |
| 7 | B | 0.5 | 1.1 | 3 | Nb + Ti = 4 | | 7 | B | 930 | 9% | — | — | — | Inv. ex. |
| 8 | C | 0.6 | 1.4 | 3 | Si + Al + Nb + Ti = 15 | | 18 | B | 890 | 13% | — | — | — | Inv. ex. |
| 9 | D | 0.5 | 1.6 | 6 | Si + Al + Nb + Ti = 19 | | 25 | A | 930 | — | 80 | −60 | Yes | Inv. ex. |
| 10 | E | 0.6 | 1.4 | 4 | Si + Al + Nb + Ti = 15 | | 19 | A | 925 | 13% | — | — | — | Inv. ex. |
| 11 | F | 0.5 | 1.2 | 4 | Si + Al + Nb + Ti = 20 | | 24 | B | 940 | — | 80 | −60 | — | Inv. ex. |

TABLE 2-continued

| | | Surface | | Surface film | | | | Final | | | | | |
| | | | | Contents of Sn, Al, Si, Nb, Ti | | | Rust | annealing | AP | BA | | | |
| No. | Steel | roughness Ra (μm) | Cr* | Sn (at %) | Elements other than Sn (at %) | Total (at %) | resis- tance | temp. (° C.) | nitric acid % | $H_2$ (%) | DP (° C.) | Electrolysis | Remarks |
|---|---|---|---|---|---|---|---|---|---|---|---|---|---|
| 12 | G | 0.7 | 1.2 | 3 | Si + Al = 5 | 8 | B | 900 | 10% | — | — | — | Inv. ex. |
| 13 | H | 0.6 | 1.4 | 4 | Si + Al + Nb = 10 | 14 | A | 970 | 13% | | | | Inv. ex. |
| 14 | I | 0.8 | 1.3 | 5 | Si + Al + Nb + Ti = 10 | 15 | B | 940 | — | 75 | −55 | — | Inv. ex. |
| 15 | J | 0.6 | 1.2 | 1 | Si + Al + Nb + Ti = 10 | 11 | B | 900 | 10% | — | — | — | Inv. ex. |
| 16 | K | 0.7 | 1.4 | 10 | Si + Al + Nb + Ti = 30 | 40 | A | 940 | — | 85 | −60 | — | Inv. ex. |
| 17 | L | 0.3 | 1.0* | 3 | Si + Al + Nb + Ti = 10 | 13 | C | 920 | 9% | — | — | — | Comp. ex. |
| 18 | M | 0.4 | 1.1 | 4 | Si + Al + Nb + Ti = 5 | 9 | C | 930 | 8% | — | — | — | Comp. ex. |
| 19 | N | 0.5 | 1.0* | 3 | Si + Al + Nb + Ti = 3 | 6 | C | 880 | 9% | — | — | — | Comp. ex. |
| 20 | O | 0.4 | 1.0* | 2 | Si + Al + Nb + Ti = 7 | 9 | C | 880 | — | 80 | −60 | — | Comp. ex. |
| 21 | P | 0.4 | 1.1 | 1 | Si + Al + Nb + Ti = 3 | 4* | C | 940 | — | 80 | −45 | — | Comp. ex. |
| 22 | Q | 0.5 | 1.0* | 0* | Si + Al + Nb + Ti = 4 | 4* | C | 920 | 9% | — | — | — | Comp. ex. |
| 23 | AA | 0.4 | 1.2 | 3 | Si + Al = 10 | 13 | C | 870 | 6% | — | — | — | Comp. ex. |
| 24 | AB | 0.6 | 1.1 | 4 | Si + Al = 10 | 14 | C | 880 | 7% | — | — | — | Comp. ex. |
| 25 | AC | 0.5 | 1.1 | 5 | Si + Al = 5 | 10 | C | 860 | 8% | — | — | — | Comp. ex. |
| 26 | AD | 0.6 | 1.1 | 3 | Si + Al = 10 | 13 | C | 870 | 7% | — | — | — | Comp. ex. |
| 27 | AE | 0.5 | 1.1 | 4 | Si + Al = 10 | 14 | C | 880 | 9% | — | — | — | Comp. ex. |
| 28 | AF | 0.4 | 1.1 | 3 | Si + Al = 5 | 8 | C | 890 | 8% | — | — | — | Comp. ex. |
| 29 | AG | 0.5 | 1.1 | 4 | 0* | 0* | C | 870 | 7% | — | — | — | Comp. ex. |
| 30 | AH | 0.5 | 1.1 | 0* | Si + Al + Nb + Ti = 5 | 5 | C | 880 | 7% | — | — | — | Comp. ex. |
| 31 | SUS304 | | | | | | B | | | | | — | Conv. ex. |
| 32 | SUS444 | | | | | | A | | | | | — | Conv. x. |

(Notes)
*marks indicate off from provisions of the present invention.
Cr* means (average concentration of Cr in surface film)/(Concentration of Cr inside of steel sheet).
x marks indicate off from target of the present invention.
— marks mean not performed.
AP: indicates annealing in oxidizing atmosphere + pickling process.
Note that "nitric acid %" means mass % of concentration of nitric acid in nitric hydrofluoric acid dipping step after alkali salt bath dipping + neutral salt electrolysis.
BA: indicates bright annealing.
Note that $H_2$ means hydrogen concentration of hydrogen-nitrogen mixed gas, DP indicates dew point of gas, and electrolysis indicates presence of any electrolysis after bright annealing.

As clear from Table 2, Nos. 1, 4, 7, 8, 11, 12, 14, and 15 are high purity ferritic stainless steels which have the chemical composition and arithmetic average roughness Ra prescribed in the present invention. These steel sheets were confirmed to have average concentrations of Cr in the surface films prescribed in the present invention. Further, in the surface films, concentration of not only Sn, but also one or more of Al, Si, Ti, and Nb was confirmed. Further, the examples were confirmed to have corrosion resistances equal to or better than SUS304.

Nos. 2, 3, 9, 10, 13, and 16 are high purity ferritic stainless steels which satisfy the preferable chemical composition and arithmetic average roughness Ra prescribed in the present invention. These steel sheets were confirmed to have concentrations of Cr in the surface films prescribed in the present invention. Further, in the surface films, confirmation of not only Sn, but also one or more of Al, Si, Ti, and Nb was confirmed. Further, excellent corrosion resistances above SUS304 and equal to SUS444 were confirmed. Note that No. 13 has a content of Cr of 23% or more—which is not preferable from the viewpoint of the alloy costs.

Nos. 5 and 6 are examples which have the chemical composition prescribed in the present invention, but have surface roughnesses off from the arithmetic average roughness Ra prescribed in the present invention. These steel sheets did not give the corrosion resistance which is targeted by the present invention.

Nos. 17 to 30 are examples which have the surface roughness prescribed in the present invention, but are off from the chemical composition prescribed in the present invention. These steel sheets did not give the corrosion resistance which is targeted by the present invention.

From the results, it was confirmed that it is possible to achieve corrosion resistance and secure an anti-glare property by the chemical composition prescribed in the present invention to which Sn is added and the surface properties prescribed in the present invention whereby Cr and Sn concentrate at the surface film while Al and Si also concentrate at the surface film. Further, even if the steel sheet is made to include at least one of Nb and Ti, it could be confirmed that similar advantageous effects could be obtained.

Note that what was explained above was just illustrations of embodiments of the present invention. The present invention can be changed in various ways within the scope of description of the claims.

INDUSTRIAL APPLICABILITY

According to the present invention, it is possible to obtain alloy-saving type high purity ferritic stainless steel sheet, without relying on high alloying by addition giving a large content of at least one of Cr and No and without limitation to surface film formed by bright annealing, by utilizing the addition of Sn to doubly provide an anti-glare property and corrosion resistance.

The invention claimed is:
1. A high purity ferritic stainless steel sheet excellent in corrosion resistance and anti-glare property, which comprises a steel sheet which contains, by mass %,
C: 0.001 to 0.03%,
Si: 0.01 to 1%,
Mn: 0.01 to 1.5%,
P: 0.005 to 0.05%,
S: 0.0001 to 0.01%,
Cr: 13 to 30%,
N: 0.001 to 0.03%,

Al: 0.005 to 1%, and
Sn: 0.06 to 0.48%, and
has a balance of Fe and unavoidable impurities, and which further comprises a surface film,
said surface film containing, by ratio of only cations which make up said surface film other than C, O, and N, one or both of Al and Si in a total of 5 to 50 at %, and 1 to 10 at % Sn, and an average concentration of Cr in said surface film being, by ratio of only cations which make up said surface film other than C, O, and N, 1.1 to 3 times the concentration of Cr inside said steel sheet, and
said surface film having a surface roughness of an arithmetic average roughness Ra of 0.3 to 1.2 μm.

2. The high purity ferritic stainless steel sheet excellent in corrosion resistance and anti-glare property as set forth in claim 1 wherein said steel sheet further contains, by mass %, one or more of types of elements selected from
Nb: 0.03 to 0.5%,
Ti: 0.03 to 0.5%,
Ni: 0.1 to 0.5%,
Cu: 0.1 to 0.5%,
Mo: 0.1 to 0.5%,
V: 0.01 to 0.5%,
Zr: 0.01 to 0.5%,
Co: 0.01 to 0.5%,
Mg: 0.0001 to 0.005%,
B: 0.0003 to 0.005%, and
Ca: 0.005% or less, and
said surface film further contains, by ratio of only cations which make up said surface film other than C, O, and N, one or more types of Al, Si, Nb, and Ti in a total of 5 to 50 at %.

3. The high purity ferritic stainless steel sheet excellent in corrosion resistance and anti-glare property as set forth in claim 1 wherein said steel sheet further contains, by mass %, one or more types of elements selected from:
La: 0.001 to 0.1%,
Y: 0.001 to 0.1%,
Hf: 0.001 to 0.1%, and
REM: 0.001 to 0.1%.

4. The high purity ferritic stainless steel sheet excellent in corrosion resistance and anti-glare property as set forth in claim 2 wherein said steel sheet further contains, by mass %, one or more types of elements selected from:
La: 0.001 to 0.1%,
Y: 0.001 to 0.1%,
Hf: 0.001 to 0.1%, and
REM: 0.001 to 0.1%.

* * * * *